United States Patent
Yoshino et al.

(10) Patent No.: US 7,837,234 B2
(45) Date of Patent: Nov. 23, 2010

(54) PIPE JOINT UNIT AND METHOD OF MANUFACTURING THE SAME

(75) Inventors: Makoto Yoshino, Okazaki (JP); Kinji Ochiai, Kasugai (JP); Koji Tanaka, Nishio (JP); Manabu Suzuki, Kariya (JP); Takeshi Hishikawa, Anjo (JP)

(73) Assignees: Denso Corporation, Kariya (JP); DENSO Airs Corporation, Anjo (JP)

( * ) Notice: Subject to any disclaimer, the term of this patent is extended or adjusted under 35 U.S.C. 154(b) by 378 days.

(21) Appl. No.: 12/005,253

(22) Filed: Dec. 26, 2007

(65) Prior Publication Data

US 2008/0157525 A1 Jul. 3, 2008

(30) Foreign Application Priority Data

Dec. 27, 2006 (JP) .............................. 2006-353018

(51) Int. Cl.
 *F16L 37/00* (2006.01)
(52) U.S. Cl. ...................................... 285/305; 285/319
(58) Field of Classification Search ................. 285/374, 285/305, 321, 282, 276, 280, 319
 See application file for complete search history.

(56) References Cited

U.S. PATENT DOCUMENTS

| | | | | |
|---|---|---|---|---|
| 3,628,768 A | * | 12/1971 | Hutt ............................ | 285/305 |
| 3,735,928 A | * | 5/1973 | Watts et al. .................. | 285/305 |
| 5,219,185 A | * | 6/1993 | Oddenino .................... | 285/305 |
| 5,341,773 A | * | 8/1994 | Schulte et al. ............... | 285/305 |
| 5,364,131 A | * | 11/1994 | Hartsock et al. ............. | 285/321 |
| 5,575,512 A | * | 11/1996 | Umezawa .................... | 285/319 |
| 5,857,718 A | * | 1/1999 | Kleinschmidt ............... | 285/305 |
| 5,860,677 A | * | 1/1999 | Martins et al. ............... | 285/305 |
| 5,988,704 A | | 11/1999 | Ryhman | |
| 5,992,902 A | * | 11/1999 | Knapp .......................... | 285/305 |
| 6,386,596 B1 | * | 5/2002 | Olson ........................... | 285/321 |

(Continued)

FOREIGN PATENT DOCUMENTS

CN 1865755 11/2006

(Continued)

OTHER PUBLICATIONS

Office action dated Jun. 4, 2008 in German Application No. 10 2007 061906.7 with English translation.

(Continued)

*Primary Examiner*—David E Bochna
(74) *Attorney, Agent, or Firm*—Harness, Dickey & Pierce, PLC

(57) ABSTRACT

A pipe joint unit includes a first pipe member with a male joint, a second pipe member with a female joint, and a pipe joint member coupling the first pipe member and the second pipe member. The male joint is received in the female joint such that an outer peripheral surface of the male joint is opposed to an inner peripheral surface of the female joint. The pipe joint member includes an engagement part that is elastically displaceable in the radial direction, and engages with the first and second pipe members. The male joint and the female joint have rotation restricting parts on the outer peripheral surface and the inner peripheral surface, respectively, for restricting relative rotation of the first and second pipe members.

14 Claims, 9 Drawing Sheets

U.S. PATENT DOCUMENTS

| | | |
|---|---|---|
| 7,014,221 B2 | 3/2006 | Iwasaki et al. |
| 7,178,837 B2 * | 2/2007 | Yoshino ........................ 285/305 |
| 7,387,318 B2 * | 6/2008 | Yoshida ........................ 285/321 |
| 7,393,019 B2 * | 7/2008 | Taga et al. .................... 285/321 |
| 7,571,939 B2 * | 8/2009 | Yoshida et al. ............... 285/321 |
| 7,578,529 B2 * | 8/2009 | Lutzke et al. ................. 285/321 |
| 7,699,356 B2 * | 4/2010 | Bucher et al. ................. 285/321 |
| 2006/0202475 A1 | 9/2006 | Gunderson |
| 2006/0220380 A1 | 10/2006 | Yoshino |

FOREIGN PATENT DOCUMENTS

| | | |
|---|---|---|
| DE | 103 60 612 | 7/2004 |
| JP | 06-031669 | 4/1994 |
| JP | 2002-295763 | 10/2002 |

OTHER PUBLICATIONS

Office action dated Jul. 10, 2009 in corresponding Chinese Application No. 2007 1019 9356.2.

Office action dated Aug. 24, 2009 in corresponding German Application No. 10 2007 061906.7.

U.S. Appl. No. 11/818,564, filed Jun. 14, 2007, Yoshino.

* cited by examiner

US 7,837,234 B2

PIPE JOINT UNIT AND METHOD OF MANUFACTURING THE SAME

CROSS REFERENCE TO RELATED APPLICATION

This application is based on Japanese Patent Application No. 2006-353018 filed on Dec. 27, 2006, the disclosure of which is incorporated herein by reference.

FIELD OF THE INVENTION

The present invention relates to a pipe joint unit including a pipe joint member for coupling a first pipe member having a male joint and a second pipe member having a female joint, and a method of manufacturing the same. The pipe joint unit is, for example, used for coupling refrigerant pipes of a refrigerant cycle of a vehicular air conditioner.

BACKGROUND OF THE INVENTION

For example, a pipe joint unit disclosed in Japanese Examined Patent Application Publication No. 6-31669 (B2) includes a first pipe member having a male joint part, a second pipe member having a female joint part, an engagement member as a pipe joint member for engaging the male joint part and the female joint part, and a semi-cylindrical member used for disengaging the engagement member.

The female joint part has a generally tubular shape and is formed with openings on its circumference. The engagement member includes elastic arm portions, engagement portions at ends of the elastic arm portions to engage with the openings of the female joint part, and tapered pressure-receiving surfaces at opposite ends of the elastic arm portions. The semi-cylindrical member has a tapered pressing surface on an end.

When the male joint part is received in the female joint part, the engagement member is disposed between peripheral walls of the first and second pipe members such that the elastic arm portions extend in an axial direction between the peripheral wall of the first and second pipe members, and the engagement portions are engaged with the openings of the female joint part. Thus, the first and second pipe members are engaged through the engagement member.

For separating the first and second pipe members coupled in the above condition, the semi-cylindrical member, which is loosely mounted on the first pipe member, is slid in the axial direction so that the pressing surface is pressed into contact with the pressure receiving surfaces of the elastic arm portions of the engagement member. As such, the elastic arm portions are elastically deformed in a radial direction, and thus the engagement portions are removed from the openings. Accordingly, the engagement member is disengaged from the female joint part, and thus the first and second pipe members are separated.

In the disclosed pipe joint unit, the engagement member is engaged with the female joint part by inserting the male joint part into the female joint part. Namely, the first pipe member and the second pipe member are coupled with the engagement member by a one-touch operation.

However, because the engagement member is rotatable about the first pipe member, it will be rotated between the male joint part and the female joint part. As a result, one of the first pipe member and the second pipe member will be rotated in association with the rotation of the engagement member. The rotation will cause wear of sealing portions, and leakage of an internal fluid such as a refrigerant due to vibrations.

Further, such a pipe joint unit may be employed to couple rubber hoses. For example, the male joint part and the female joint part may be coupled to ends of the rubber hoses, respectively. In this case, the rotation of the engagement member will result in interference of the rubber hoses with peripheral parts if the rubber hoses are unevenly arranged.

SUMMARY OF THE INVENTION

The present invention is made in view of the foregoing matter, and it is an object of the present invention to provide a pipe joint unit capable of restricting relative rotation of a first pipe member and a second pipe member without increasing the number of parts, and a method of manufacturing the pipe joint unit.

According to an aspect of the present invention, a pipe joint unit includes a first pipe member having a male joint, a second pipe member having a female joint and a pipe joint coupling the first and second pipe members. The male joint includes an outer peripheral surface, and the female joint includes an inner peripheral surface. The male joint of the first pipe member is disposed in the female joint of the second pipe member such that the outer peripheral surface of the male joint is opposed to the inner peripheral surface of the female joint. The male joint and the female joint have rotation restricting parts on the outer peripheral surface and the inner peripheral surface, respectively, that engage with each other so that the relative rotation of the first and second pipe members is restricted.

Accordingly, relative rotation of the first and second pipe members is restricted by the rotation restricting parts of the male joint and the female joint. That is, the relative rotation of the first and second pipe members is restricted without increasing the number of parts.

For example, the rotation restricting part of the male joint is provided by a first fitting portion that is formed on an outer peripheral surface of an expansion of the male joint. The rotation restricting part of the female joint is provided by a first fitted portion that is formed on an inner peripheral surface of an expanded pipe portion of the female joint, the expanded pipe portion being located radially outside of the expansion of the male joint. The first fitting portion and the first fitted portion are configured to be capable of engaging with each other. For example, the first fitting portion is in a form of one of projection and groove and the first fitted portion is in a form of the other.

The expansion of the male joint is, for example, formed by bulge forming. The expanded pipe portion of the female joint is, for example, formed by expansion forming. Therefore, the first fitting portion is formed at the same time as forming the expansion by bulge forming, and the first fitted portion is formed at the same time as forming the expanded pipe portion by expansion forming. As such, manufacturing costs reduce.

As another example, the rotation restricting part of the male joint is provided by a second fitting portion that is formed adjacent to an end of the male joint. The rotation restricting part of the female joint is provided by a second fitted portion that is formed on the inner peripheral surface adjacent to a position corresponding to the end of the male joint. For example, the second fitting portion is in a form of one of projection and groove and the second fitted portion is in a form of the other.

The male joint and the female joint are, for example, formed by expansion forming. Therefore, the second fitting portion and the second fitted portion are formed at the same time as forming the male joint and the female joint, respectively, by expansion forming. As such, manufacturing costs reduce.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereafter, first to sixth embodiments of the pre-sent invention will be described with reference to the accompanying drawings. In the second to sixth embodiments, components similar to those of the first embodiment will be indicated by the same numerals and will not be described further.

First Embodiment

Figure 1:
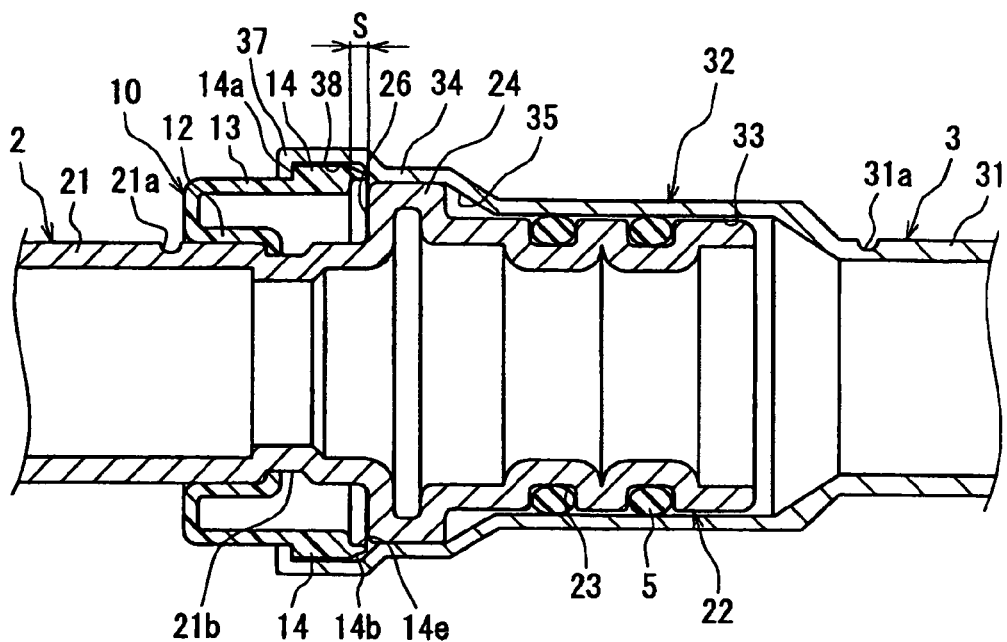
FIG. 1 is a schematic cross-sectional view of a pipe joint unit according to a first embodiment of the present invention.

Referring to FIG. 1, a pipe joint unit of the first embodiment is exemplarily employed to couple refrigerant pipes of a refrigerant cycle of a vehicular air conditioner. The pipe joint unit of the first embodiment includes a first pipe member 2, a second pipe member 3 and a pipe joint member (engagement member) 10 for coupling the first and second pipe members 2, 3.

The first pipe member 2 has a male joint 22 at its end, and the second pipe member 3 has a female joint 32 at its end. The first pipe member 2 and the second pipe member 3 are coupled by inserting the male joint 22 into the female joint 32 in a condition that the pipe joint member 10 is mounted on the first pipe member 2. That is, the pipe joint unit is configured such that the first pipe member 2 and the second pipe member 3 are engaged through the pipe joint member 10.

The first pipe member 2 has a generally tubular shape for defining a passage therein for allowing a fluid, such as a refrigerant, to flow. The first pipe member 2 includes a pipe main portion 21 and the male joint 22 at an end of the pipe main portion 21. The male joint 22 has a diameter larger than that of the pipe main portion 21.

The male joint 22 is formed with sealing grooves 23, and sealing members 5 such as rubber O-rings are fitted in the sealing grooves 23. The sealing grooves 23 are formed on an outer peripheral surface of the male joint 22 and extend in a circumferential direction in an annular shape. In the present embodiment, the male joint 22 has two sealing grooves 23, for example.

The male joint 22 is further formed with an expansion 24 on an end opposite to the sealing grooves 23, that is, on an end connecting to the pipe main portion 21. The expansion 24 expands in a radially outward direction, such as in a form of flange. The expansion 24 has an outer wall that forms a substantially cylindrical shape.

That is, the male joint 22 includes the expansion 24 at an end adjacent to the pipe main portion 21 and a sealing sleeve portion extending from the expansion 24. The sealing grooves 23 are formed on the sealing sleeve portion.

Also, the expansion 24 has a first axial end wall on a rear side, that is, on a side adjacent to the pipe main portion 21. The first axial end wall extends in a radially outward direction toward the outer wall and forms a step with the end of the pipe main portion 21. The first axial end wall serves as a first engaged portion 26 is engaged with engagement parts 14 of the pipe joint member 10. The expansion 24 further has a second axial end on a front side, that is, on a side opposite to the first axial end wall in an axial direction. The second axial end wall extends in the radially outward direction toward the outer wall. The second axial end wall is brought into contact with a base portion of an expanded pipe portion 34 of the second pipe member 3.

Figure 3:
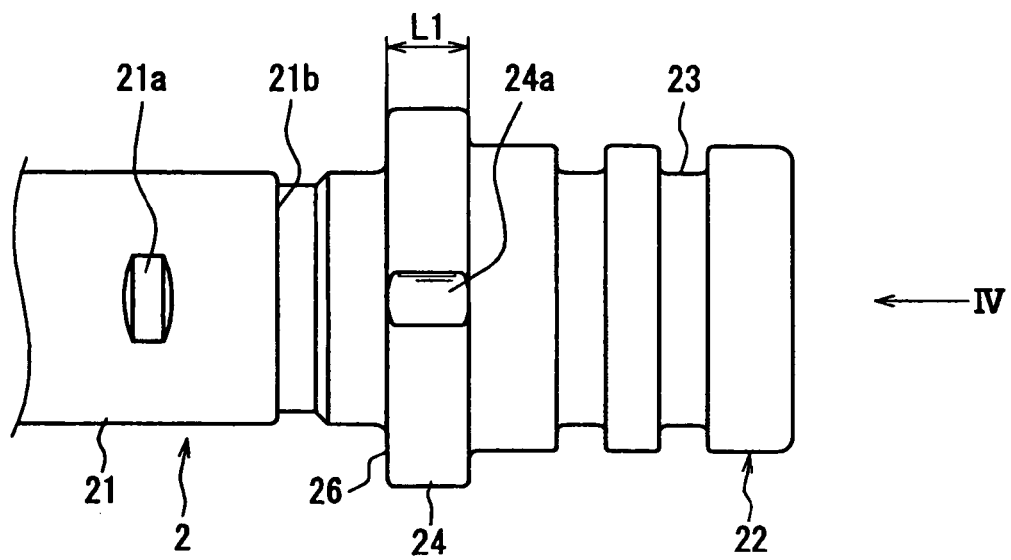
FIG. 3 is a side view of a first pipe member of the pipe joint unit according to the first embodiment.
Figure 4:
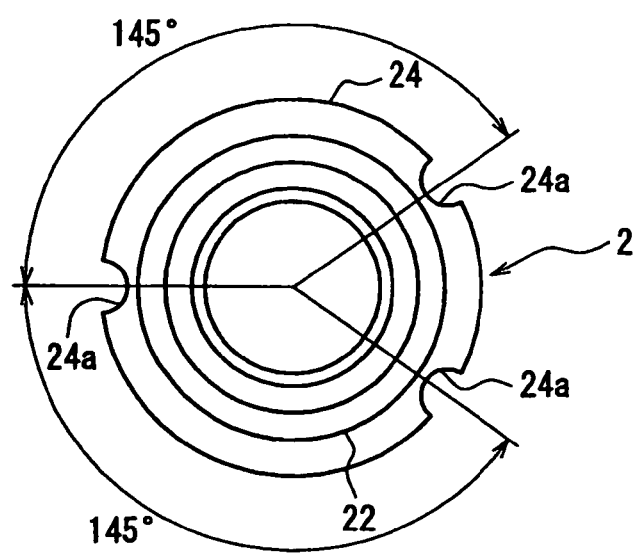
FIG. 4 is an end view of the first pipe member viewed along an arrow IV in FIG. 3.

As shown in FIGS. 3 and 4, the outer wall of the expansion 24 is formed with first fitting portions 24a. The first fitting portions 24a serve as detent portions (rotation restricting part) for restricting relative rotation of the first and second pipe members 2, 3.

The pipe main portion 21 has a restraining portion 21b at a position adjacent to the expansion 24. The restraining portion 21b is, for example, provided by a recess or an annular groove. The restraining portion 21b is provided for positioning the pipe joint member 10 relative to the first pipe member 2 when the pipe joint member 10 is mounted on the first pipe member 2. In other words, the restraining portion 21b serves as a stopper portion for restricting a displacement of the pipe joint member 10 in a rearward direction, such as in a leftward direction in FIG. 1, when the first pipe member 2 is being coupled to the second pipe member 3.

In the present embodiment, the restraining portion 21b is provided by the groove, for example. However, the shape of the restraining portion 21b is not limited to the above. That is, a structure of the stopper portion is not limited to the above.

The restraining portion 21b may be provided by a projection projecting from an outer peripheral surface of the pipe main portion 21. In this case, the pipe joint member 10 has a recess or groove to receive the projection of the restraining portion 21b.

The second pipe member 3 has a generally tubular shape and defines a passage therein for allowing the refrigerant to flow. The second pipe member 3 has a pipe main portion 31 and the female joint 32 at an end of the pipe main portion 31 for receiving the male joint 22 of the first pipe member 2 therein. The female joint 32 has a diameter greater than that of the pipe main portion 31.

The female joint 32 includes a receiving portion (first sleeve portion) 33, the expanded pipe portion (second sleeve portion) 34, and an extended pipe portion (third sleeve portion) 37. The receiving portion 33 extends from the end of the pipe main portion 31 and receives the sealing sleeve portion of the male joint 22 therein. The receiving portion 33 has a radially inner wall that is sealed with the male joint 22 through the sealing members 5. The receiving portion 33 has a conical wall portion 35 at an end. The expanded pipe portion 34 extends from the receiving portion 33 through a conical wall portion 35, and is more expanded than the receiving portion 33. The extended pipe portion 37 extends from the expanded pipe portion 34 in a forward direction of the second pipe member 3, such as, in the leftward direction in FIG. 1.

The expanded pipe portion 34 is configured to receive the expansion 24 of the male joint 22 therein. The expanded pipe portion 34 is formed with first fitted portions 34a on its inner peripheral surface. The first fitted portions 34a are meshed or fitted with the first fitting portions 24a of the male joint 22, thus serve as detent portion (rotation restricting part) for restricting the relative rotation of the first and second pipe members 2, 3.

The extended pipe portion 37 is more expanded in the radially outward direction than the expanded pipe portion 34. The extended pipe portion 37 has an axial end wall that extends in a radially inward direction at an end thereof. Thus, the extended pipe portion 37 forms a radially inner step portion 38 in the form of annular groove on its radially inside. That is, the extended pipe portion 37 is configured such that the radially inner step portion 38 receives the engagement parts 14 of the pipe joint member 10 therein, and the axial end wall of the radially inner step portion 38 contacts second contact portions 14a of the engagement parts 14.

Specifically, the extended pipe portion 37 forms a groove or an opening therein as the radially inner step portion 38 such that the engagement parts 14 of the pipe joint member 10, which is mounted on the first pipe member 2, is capable of being received therein when a base portion of the expanded pipe portion 34 is brought into contact with the expansion 24, while the first and second pipe members 2, 3 are being coupled.

The receiving portion 32, the expanded pipe portion 34 and the extended pipe portion 37 are formed by plastically forming an end of the main pipe portion 31, such as by expansion forming. In the present embodiment, the radially inner step portion 38 is in the form of annular groove that extends entirely in the circumferential direction. However, the shape of the radially inner step portion 38 is not limited to the above. For example, the radially inner step portion 38 may be partly formed in the circumferential direction. That is, the expanded pipe portions 37 can be formed to provide plural grooves or openings therein that are discontinuous in the circumferential direction.

Figure 2:
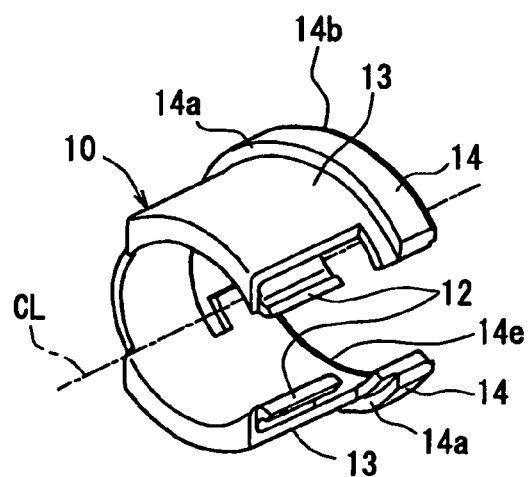
FIG. 2 is a perspective view of a pipe joint member of the pipe joint unit according to the first embodiment.

As shown in FIGS. 1 and 2, the pipe joint member 10 is configured to partly mount on the outer wall of the expansion 24 on a side opposite to the end of the male joint 22 in the axial direction. For example, the pipe joint member 10 is made of a resinous material to allow later-described elastic displacement. Instead, the pipe joint member 10 may be integrally made of a metallic material or a mixture of a metallic material and a resinous material.

The pipe joint member 10 has a generally ring shape to be coaxial with the first and second pipe members 2, 3. In FIG. 2, a line LC represents an axis of the pipe joint unit. As shown in FIG. 1, the pipe joint member 10 is configured to be generally arranged in a space defined between an inner peripheral surface of the extended pipe portion 37 of the female joint 32 and the outer peripheral surface of the pipe main portion 21 of the first pipe member 2.

The pipe joint member 10 generally includes a pipe mounting part 12, elastic displacing parts 13 and the engagement parts 14. The engagement parts 14 extend from an axial end of the elastic displacing parts 13 and are engaged with the expansion 24 of the male joint 22 and the radially inner step portion 38 of the female joint 32. The elastic displacing parts 13 have elasticity to allow the engagement parts 14 to elastically displace in the radial direction. The pipe mounting part 12 is formed to mount on the radial outer surface of the pipe main portion 21 of the first pipe member 2. That is, the pipe joint member 10 is mounted on the pipe main portion 21 through the pipe mounting part 12.

The engagement parts 14 are formed at radially opposed positions with respect to the axis CL. In the present embodiment, the pipe joint member 10 has two engagement parts 14, for example. The number of the engagement parts 14 may be modified to any numbers, such as three or six, according to withstanding resistance to pressure. For example, the pipe joint member 10 has plural engagement parts 14, and the plural engagement parts 14 are arranged such that two of the engagement parts 14, which are opposed in the radial direction, are paired, and plural pairs of the engagement parts 14 are spaced in the circumferential direction.

Each of the engagement parts 14 has a first contact portion 14e at its end. The first contact portion 14e is, for example, in a form of projection. The first contact portion 14e engages with the first engaged portion 26 of the expansion 24. The engagement part 14 further has a second contact portion 14a on a side opposite to the first contact portion 14e in the axial direction. The second contact portion 14a, for example, provides a flat surface. The second contact portion 14a engages with the axial end of the radially inner step portion 38 of the second pipe member 3. Namely, the engagement part 14 is engaged with the first engaged portion 26 of the first pipe member 2 and the radially inner step portion 38 of the second pipe member 3 at the axially opposite ends thereof.

After the first and second pipe members 2, 3 are coupled, when the first and second pipe members 2, 3 are filled with the fluid and an internal pressure due to the fluid is increased, the first and second pipe members 2, 3 receives forces in directions to separate the first and second pipe members 2, 3. When the first and second pipe members 2, 3 receive forces in the directions to separate thereof, the second contact portions 14a contact the axial end surface of the radially inner step portion 38 in the axial direction. Thus, the engagement parts 14 are engaged with the extended pipe portion 37 of the female joint 32.

Each of the engagement parts 14 has an arc shape along the circumference of the elastic displacing part 13. The engagement part 14 provides a part of an annular shape. The engagement part 14 has a generally rectangular shape or a generally trapezoidal shape in a cross-section defined in a plane passing through the axis CL. The engagement part 14 has a tapered outer surface 14b on its axial end. The tapered outer surface 14b is provided by a part of a cone.

The engagement part 14 is provided by a part of a cylindrical shape. The engagement part 14 has a radially outer wall and a radially inner wall opposed in the radial direction. An axial end of the radially outer wall is inclined toward the axis CL to provide the tapered outer surface 14. The engagement part 14 has a first axial end surface and a second axial end surface. Each of the first axial end surface and the second axial end surface has a partial disc space.

The first axial end surface is located on a radially inside of the tapered outer surface 14b, and forms a stepped portion for providing the first contact portion 14e that is engaged with the first engaged portion 26. The second axial end surface provides the second contact portion 14a that is engaged with the axial end of the radially inner step portion 38.

The engagement part 14 is made of a resinous material and is solid over the axial direction. The engagement part 14 has a predetermined strength, which is capable of withstanding the force generated in the direction to separate the first and second pipe member 2, 3 along the axial direction.

The first and second pipe members 2, 3 are coupled by engaging the first contact portions 14e and the second contact portions 14a with the expansion 24 and the axial end of the radially inner step portion 38, respectively. Further, since the engagement parts 14 have the tapered outer surfaces 14b at the ends, the engagement parts 14 can be smoothly deflected in the radially inward direction along the axial end of the extended pipe member 37 when the first pipe member 2 is being inserted into the second pipe member 3. The pipe joint member 10 can be smoothly inserted into the extended pipe portion 37.

The pipe mounting part 12 of the pipe joint member 10 has a generally thin cylindrical shape and has a slit in the axial direction. In other words, the pipe mounting part 12 has a substantially C-shape in a cross-section defined perpendicular to the axis CL. The pipe mounting part 12 has predetermined elasticity. Thus, the pipe joint member 10 is mounted on the first pipe member 2 from the radially outside of the first pipe member 2 by expanding the C-shaped pipe mounting part 12 in the radial direction. In other words, the pipe mounting part 12 is mounted to the first pipe member 2 through the slit. An axial end of the pipe mounting part 12 is bent in the radially inward direction to engage with the restraining portion 21b of the pipe main portion 21, as shown in FIG. 1.

The elastic displacing parts 13 connect the other axial end of the pipe mounting part 12 and the engagement parts 14. Also, the elastic displacing parts 13 support the engagement parts 14 such that the engagement parts 14 can be elastically displaced in the radial direction. For example, the elastic displacing parts 13 extend from the axial end of the pipe mounting part 12 in a radially outward direction and further extend in the axial direction to overlap with an outer peripheral surface of the pipe mounting part 12 with clearances. Further, the elastic displacing parts 13 connect to the engagement parts 14. Thus, the pipe mounting part 12 and the elastic displacing parts 13 form a substantially U-shape in the cross-section defined in a plane passing through the axis CL, as shown in FIG. 1. Also, each of the elastic displacing parts 13 has an arc shape along the circumferential direction and provides a part of an annular shape.

Each of the elastic displacing parts 13 has a thickness smaller than a thickness of the engagement part 14 with respect to the radial direction. Therefore, the elastic displacing part 13 has sufficient elasticity in the radial direction, though the elastic displacing part 13 and the engagement part 14 are made of the same resinous material. The elastic displacing part 13 supports the engagement part 14 such that the engagement part 14 is capable of being elastically displaced in the radial direction.

The elastic displacing parts 13 are located radially outside of the pipe mounting part 12, and are arranged at radially opposed positions with each other with respect to the axis CL. That is, the elastic displacing parts 13 are arranged symmetric with respect to the axis CL. Each of the elastic displacing parts 13 has a partial ring shape.

In the present embodiment, the pipe joint member 10 has a pair of elastic displacing parts 13, for example. Also, one engagement part 14 is formed at the axial end of each displacing portion 13. However, the number of the elastic displacing parts 13 and the number of the engagement parts 14 are not limited to the above. For example, two engagement parts 14 may be formed at the axial end of each elastic displacing part 13. Further, the radially inner step portion 38 may be separately formed at positions corresponding to the engagement parts 14.

In a case that the pipe joint member 10 has plural engagement parts 14, the engagement parts 14 may be arranged at predetermined intervals, such as regular intervals, in the circumferential direction. Also, each elastic displacing part 13 may be separated into two pieces in the circumferential direction by forming a slit in the axial direction CL. In this case, the engagement part 14 may be formed at an end of each separated piece of the elastic displacing part 13.

Because the pipe joint member 10 is mounted rotatable relative to the first and second pipe members 2, 3, the pipe joint member 10 is movable in the circumferential direction between the male joint 22 and the female joint 32. In this case, therefore, one of the first and second pipe members 2, 3 may be rotated in association with the movement of the pipe joint member 10.

In the present embodiment, to restrict the rotation of the first and second pipe members 2, 3 due to the movement of the pipe joint member 10, that is, to couple the first and second pipe members 2, 3 in a rotation restricted manner, the first fitting portions 24a and the first fitted portions 34a are formed between the outer peripheral surface of the male joint 22 and the inner peripheral surface of the female joint 32, which are opposed to each other, as the rotation restricting parts.

Figure 5:
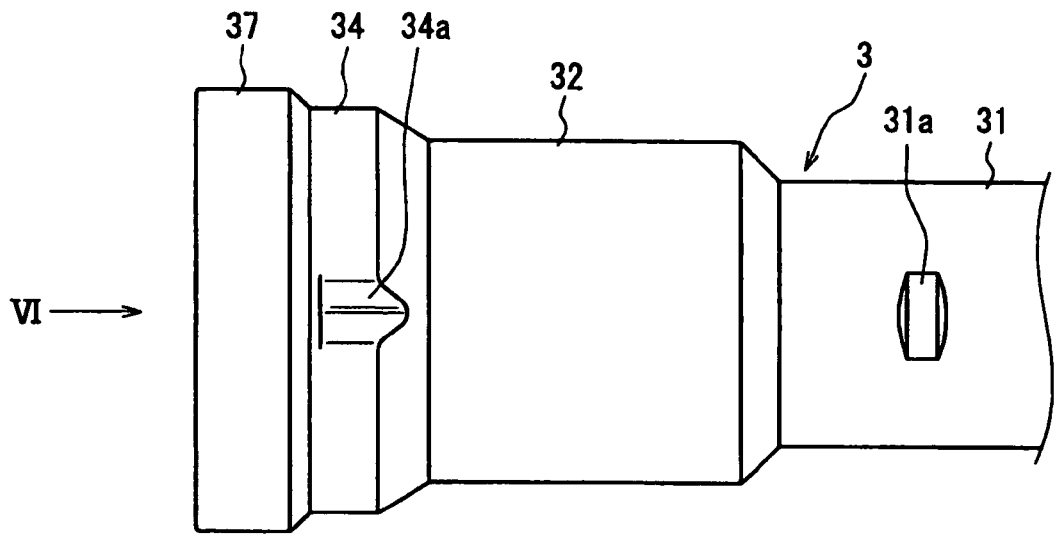
FIG. 5 is a side view of a second pipe member of the pipe joint unit according to the first embodiment.
Figure 6:
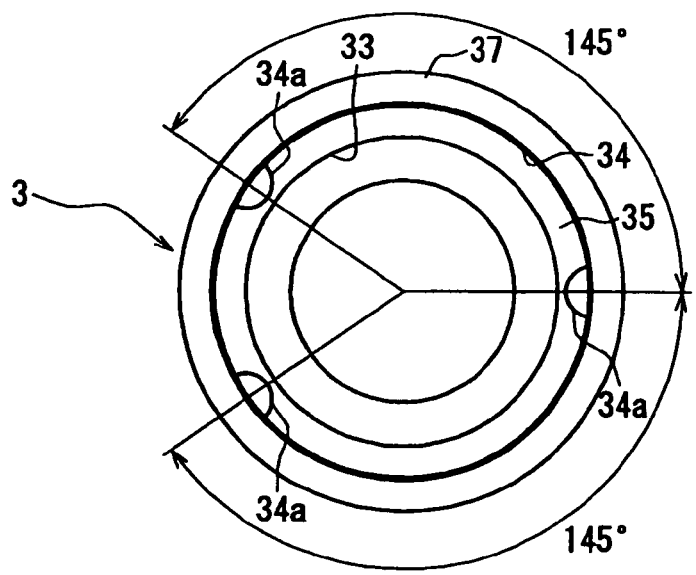
FIG. 6 is an end view of the second pipe member viewed along an arrow VI in FIG. 5.

For example, the first fitting portions 24a and the first fitted portions 34a are formed at positions where the outer peripheral surface of the male joint 22 faces or fits in the inner peripheral surface of the female joint 32. In the present embodiment, as shown in FIGS. 3 and 4, the first fitting portions 24a are formed on the outer peripheral surface, such as the radially outer wall of the expansion 24 of the first pipe member 2. Further, as shown in FIGS. 5 and 6, the first fitted portions 34a are formed on the inner peripheral surface, such as the radially inner surface of the expanded pipe portion 34 of the second pipe member 3 to fit or mate with the first fitting portions 24a.

For example, each of the first fitting portions 24a is in a form of groove having a substantially semi-circular-shaped cross-section and extending over substantially entire length L1 of the expansion 24 in the axial direction. Each of the first fitted portions 34a is in a form of a projection projecting the radially inward direction and having a substantially semi-circular-shaped cross-section to be received in the first fitting portion 24a.

Namely, the first fitting portion 24a is grasped as a recess recessing from the outer peripheral surface of the expansion 24 in the radially inward direction. The first fitting portion 24a is formed as a groove extending throughout the flanged expansion 24 in the axial direction. A radial dimension of the first fitting portion 24a, that is, a depth of the groove is smaller than a dimension of the expansion 24 in the radial direction. A circumferential dimension of the first fitting portion 24a, that is, a width of the groove is sufficiently smaller than a circumferential dimension of the expansion 24.

The first fitted portion 34a is grasped as a projection projecting from the inner peripheral surface of the female joint 32 in the radially inward direction. An axial end of the first fitted portion 34a is slightly separated from the axial end of the expanded pipe portion 34, which connects to the extended pipe portion 37, in the axial direction. An opposite axial end of the first fitted portion 34a is located on the conical wall portion 35, which forms a tapered surface and connects to the receiving portion 32. That is, the first fitted portion 34a extends from a position that is slightly separated from the extended pipe portion 37 to the conical wall portion 35.

As such, the first fitted portion 34a is grasped as a projection extending in the axial direction. Also, an apex of the first fitted portion 34a is located on an outer side of the opening defined by the receiving portion 33 with respect to the radial direction. The first fitted portion 34a is a narrow projection having a width that is sufficiently smaller than an entire circumferential length of the expanded pipe portion 34 in the circumferential direction.

The first fitting portions 24a are arranged at irregular intervals, in the circumferential direction such that the first fitting portions 24a are not point symmetry with respect to the axis. Also, the first fitted portions 34a are arranged at irregular intervals in the circumferential direction such that the first fitted portions 34a are not point symmetry with respect to the axis, but correspond to the first fitting portions 24a.

In the present embodiment, three first fitting portions 24a and three first fitted portions 34a are arranged not to be point symmetrical about the axis CL, respectively. In this case, for example, two first fitting portions 24a (e.g., right fitting portions 24a in FIG. 4) are spaced at 145° from one first fitting portion 24a (e.g., left fitting portion 24a in FIG. 4) in opposite circumferential directions. The first fitted portions 34a are arranged in the similar manner. As such, the first fitting portions 24a and the first fitted portions 34a are arranged at irregular pitches in the circumferential direction. Therefore, it is less likely that the first and second pipe members 2, 3 are erroneously coupled.

The pipe main portion 21 of the first pipe member 2 is formed with identifying portions 21a on an outer peripheral surface as positioning marks for coupling the first and second pipe members 2, 3. The identifying portions 21a are located on extensions of the first fitting portions 24a in the axial direction. The identifying portions 21a are, for example, provided by recesses that are recessed from the outer peripheral surface of the pipe main portion 21 in the radially inward direction.

The pipe main portion 31 of the second pipe member 3 is formed with identifying portions 31a on an outer peripheral surface as positioning marks for coupling the first and second pipe members 2, 3. The identifying portions 31a are located on extensions of the first fitted portions 34a in the axial direction. The identifying portions 31a are, for example, provided by recesses that are recessed from the outer peripheral surface of the pipe main portion 31 in the radially inward direction. The identifying portions 31a have length in the circumferential direction of the pipe main portion 31.

In the present embodiment, the first fitting portions 24a and the first fitted portions 34a are arranged at irregular angular pitches in the circumferential directions. Therefore, the first and second pipe members 2, 3 are coupled by corresponding the positions of the identifying portions 21a, 31a. Accordingly, the first and second pipe members 2, 3 are properly coupled to have a predetermined positional relationship. The number of the first fitting portions 24a and the number of the first fitted portions 34a are not limited to three. Also, it is not always necessary that the numbers of the identifying portions 21a, 31a are the same as the numbers of the first fitting and fitted portions 24a, 34a. For example, each of the pipe main portion 21, 31 may have one identifying portion 21a, 31a.

Next, methods of forming the first fitting portions 24a and the first fitted portions 34a as the rotation restricting parts will be described. The expansion 24 is formed from a plain pipe member, which corresponds to the pipe main portion 21, by bulge forming. The first fitting portions 24a are formed at the same time as forming the expansion 24 by bulge forming. For example, the first fitting portions 24a are formed at the same time as forming the expansion 24 using an outer die that has a shape corresponding to the expansion 24 and having projections corresponding to the first fitting portions 24a. Since the first fitting portion 24a are formed at the same time as forming the expansion 24 by bulge forming, manufacturing costs reduce.

The first fitted portions 34a are formed on the expanded pipe portion 34 at the same time as forming the expanded pipe portion 34 from a plain pipe member, which corresponds to the pipe main portion 31, by expansion forming. For example, the expanded pipe portion 34 with the first fitted portions 34a is formed using an inner die that has a shape corresponding to the expanded pipe portion 34 and having recesses corresponding to the first fitted portions 34a. Since the first fitted portions 34a are formed at the same time as forming the expanded pipe portion 34 by expansion forming, manufacturing costs reduce.

Figure 7:
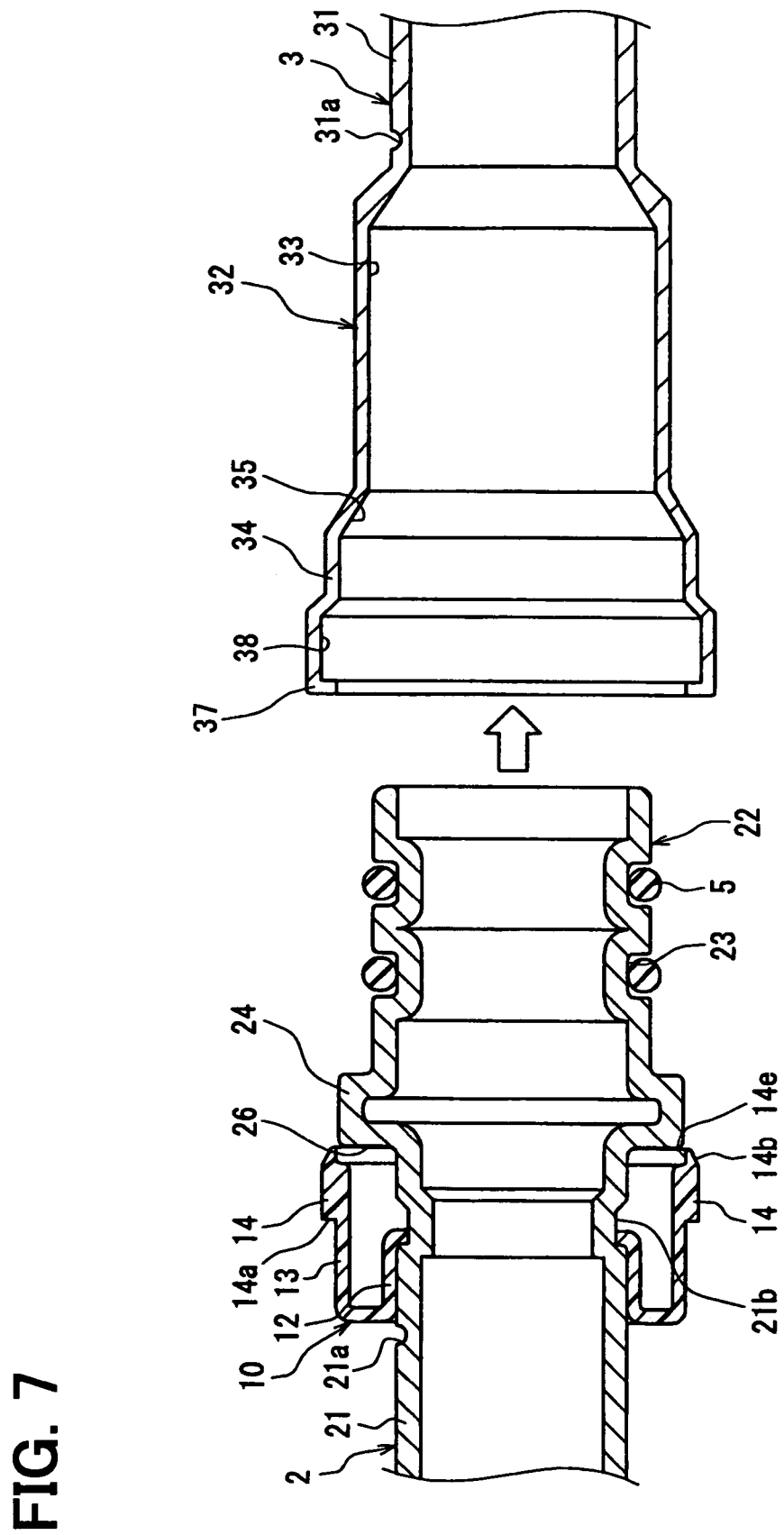
FIG. 7 is a schematic cross-sectional view of the pipe joint unit before the first pipe member is coupled to the second pipe member according to the first embodiment.
Figure 8:
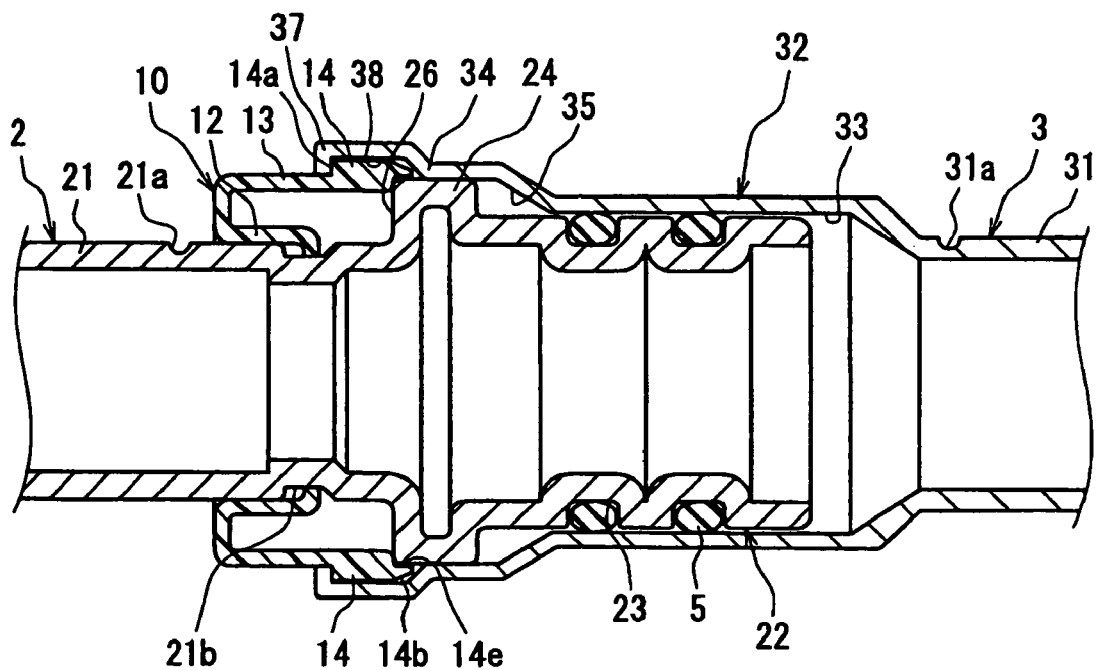
FIG. 8 is a schematic cross-sectional view for showing an operation when the first and second pipe members are being coupled according to the first embodiment.

Next, a method of assembling the pipe joint unit of the first embodiment will be described with reference to FIGS. 1, 7 and 8. FIG. 7 shows a condition before the first pipe member 2 is inserted into the second pipe member 3. FIG. 1 shows a condition immediately before an engagement of the pipe joint member 10. FIG. 8 shows a condition after the engagement and a condition after the fluid is introduced therein.

First, as shown in FIG. 7, the pipe joint member 10 is mounted on the outer periphery of the first pipe member 2 by expanding the C-shaped pipe mounting portion 12 at the slit. The first pipe member 2 is placed coaxial with the second pipe member 3 such that the male joint 22 is opposed to the extended pipe portion 37 in the axial direction while corresponding the positions of the identifying portions 21a to the positions of the identifying portions 31a. Then, the male joint 22 is inserted into the extended pipe portion 37. Further, the male joint 22 is inserted such that the end of the sealing sleeve portion of the male joint 22 reaches the inserting portion 33.

At this time, the tapered surfaces 14b of the engagement parts 14 are pressed in the radially inward direction by the end wall of the extended pipe portion 37. After the front end of the expansion 24, that is, the second axial end wall of the expansion 24 contacts the end of the expanded pipe portion 34, the front end of the expansion 24 enters the expanded pipe portion 34 while meshing the first fitting portions 24a with the first fitted portions 34a.

During the above condition, the engagement parts 14 are located radially inside of the extended pipe portion 37. When the male joint 2 is inserted up to a position where the front end of the expansion 24 contacts the base portion of the expanded pipe portion 34 as shown in FIG. 1, the engagement parts 14 are returned in the radially outward direction by the elasticity and received in the radially inner step portion 38. At this time, the engagement parts 14 are in the condition immediately before the engagement. Thus, a clearance S is provided between the front end of the engagement parts 14, such as the first contact portions 14e, and the first engaged portion 26 of the expansion 24 in the axial direction.

From this condition, the first pipe member 2 is moved in a direction separating from the second pipe member 3, such as in a leftward direction in FIG. 8 (hereafter, the removal direction). Thus, the inner walls of the first contact portions 14e of the engagement parts 14 are engaged with the first engaged portion 26 of the expansion 26. That is, since the first pipe member 2 is pulled so that the clearance S is reduced, the first engaged portion 26 is received by the first contact portions 14e in the axial direction. In addition, the second contact portions 14a of the engagement parts 14 are engaged with the axial end of the radially inner step portion 38. Thus, the first and second pipe members 2, 3 are restricted in the axial direction. Accordingly, the first and second pipe members 2, 3 are coupled by a one-touch operation.

Also, when the first and second pipe members 2, 3 are filled with the fluid and an internal pressure of the first and second pipe members 2, 3 increases, the first pipe member 2 is moved in the removal direction due to the internal pressure. At this time, therefore, the first contact portions 14e is engaged with the first engaged portion 26. Also, the second contact portions 14a are engaged with the axial end of the radially inner step portion 38.

That is, in the condition that the first and second pipe members 2, 3 are not filled with the fluid, the first contact portions 14e can be engaged with the first engaged portion 26 by forcibly pulling the first pipe member 2 in the removal direction, that is, in the leftward direction in FIG. 8, similar to the situation when the internal pressure increases. At this time, the engagement parts 14 are restricted in the radially inward direction. Therefore, even if the elastic displacing part 13 are lightly pressed in the radially inward direction, the first pipe member 2 cannot be separated from the second pipe member 3.

To separate the first pipe member 2 from the second pipe member 3, the first pipe member 2 is pressed toward the second pipe member 3, that is, in a direction opposite to the removal direction (e.g., a rightward direction in FIG. 8) so that the first engagement parts 14e are disengaged from the first engaged portion 26. After the first engagement parts 14 are disengaged from the first engaged portion 26, the elastic displacing parts 13 are pressed in the radially inward direction so that the engagement parts 14 are displaced in the radially inward direction.

In the pipe joint unit of the present embodiment, the first fitted portions 34a of the expanded pipe portion 34 are received in the first fitting portions 24a of the expansion 24. Therefore, relative rotation of the first and second pipe members 2, 3 is restricted. That is, the first pipe member 2 and the second pipe member 3 directly provide rotation restricting functions. Therefore, the rotation between the first and second pipe members 2, 3 is restricted without requiring additional members, that is, without increasing the number of parts for restricting the rotation.

In the present embodiment, the male joint 22 has two sealing grooves 23 on which the O-rings 5 are fitted. However, the number of the sealing grooves 23 and the number of the O-rings 5 are not limited to two, respectively, as long as the sealing effect between the male joint 22 and the female joint 32 is maintained. For example, the male joint 22 may have one sealing groove 23 and one O-ring 5. Also, the sealing member is not limited to the rubber O-ring 5. The sealing member may be provided by a metallic sealing member or a resinous sealing member.

In the present embodiment, the first fitting portions 24a are formed on the outer peripheral surface of the expansion 24, and the first fitted portions 34a to be engaged with the first fitting portions 24a are formed on the inner peripheral surface of the expanded pipe portion 34. The relative rotation of the first and second pipe members 2, 3 is restricted by the engagement structure of the first fitting portions 24a of the expansion 24 and the first fitted portions 34a of the expanded pipe portion 34.

Because the first fitting portions 24a and the first fitted portions 34a are formed as the same rigid material, such as metal, positioning accuracy for the engagement improves. Also, the strength of the rotation restricting parts is sufficiently maintained without increasing the size.

The first fitting portions 24a and the first fitted portions 34a are arranged at irregular intervals in the circumferential directions. Therefore, the first fitting portions 24a and the first fitted portions 34a provide the rotation restricting functions and the functions for properly positioning the first and second pipe members 2, 3 with respect to the circumferential direction. Therefore, when the pipe joint unit is mounted on a vehicle, interference with other peripheral parts are reduced. Also, wear of the sealing portions is reduced. Furthermore, leakage of the fluid due to vibrations will be reduced.

The first fitting portions 24a are formed at the same time as forming the expansion 24 into the predetermined shape by bulge forming. Also, the first fitted portions 34a are formed at the same time as forming the expanded pipe portion 34 into the predetermined shape by pipe expanding. Therefore, the manufacturing costs of the pipe joint unit is reduced. Further, the rotation restricting parts are provided by the first and second pipe members 2, 3. Therefore, the unevenness of quality of parts is reduced.

Second Embodiment

In the first embodiment, the first fitting portions 24a and the first fitted portions 34a as the rotation restricting parts are provided by the grooves and the projections, respectively. Alternatively, the first fitting portions 24a can be provided by projections, and the first fitted portions 34a can be provided by grooves for receiving the projections of the first fitting portions 24a.

Figure 9:
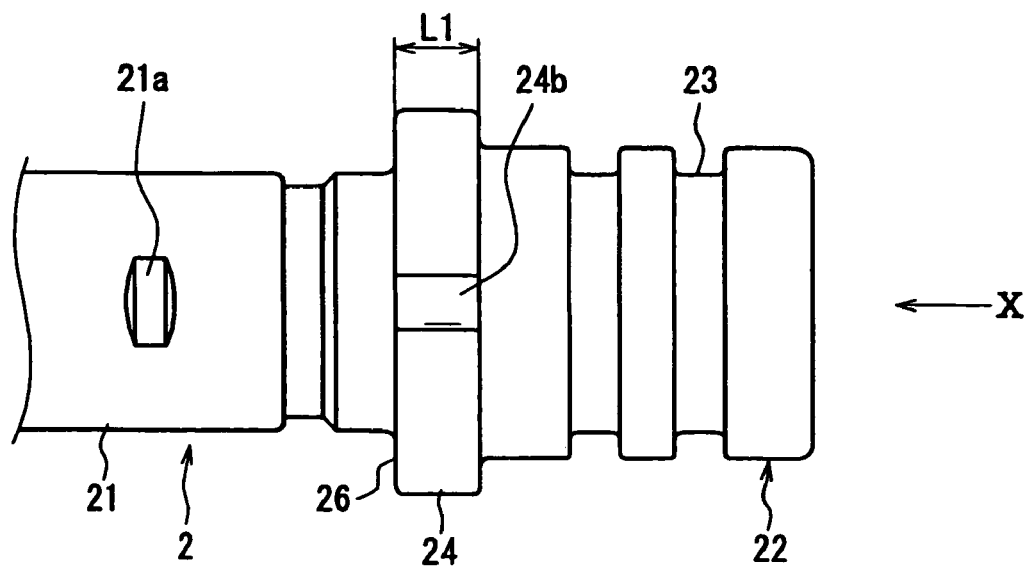
FIG. 9 is a side view of a first pipe member of a pipe joint unit according to a second embodiment of the present invention.
Figure 10:
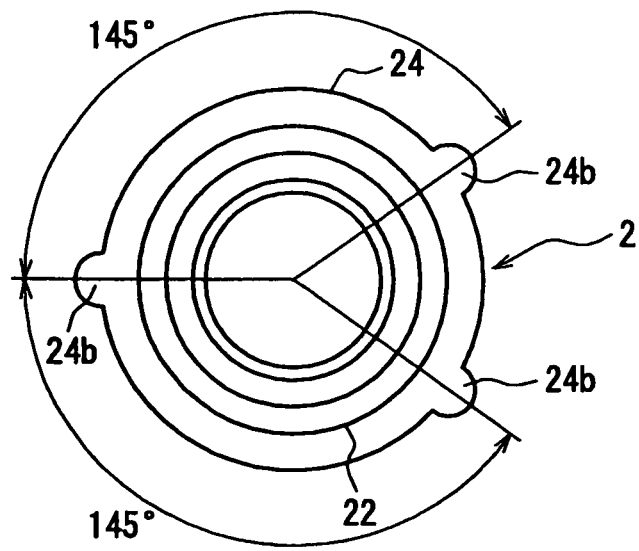
FIG. 10 is an end view of the first pipe member viewed along an arrow X in FIG. 9.

In the second embodiment, therefore, the first pipe member 2 has first fitting portions 24b in the form of projections, in place of the first fitting portions 24a in the form of grooves. As shown in FIGS. 9 and 10, the first fitting portions 24b project from the outer wall of the expansion 24 in the radially outward direction. For example, each projection has a substantially semi-circular-shaped cross-section, and extends over the axial length L1 of the expansion 24.

Figure 11:
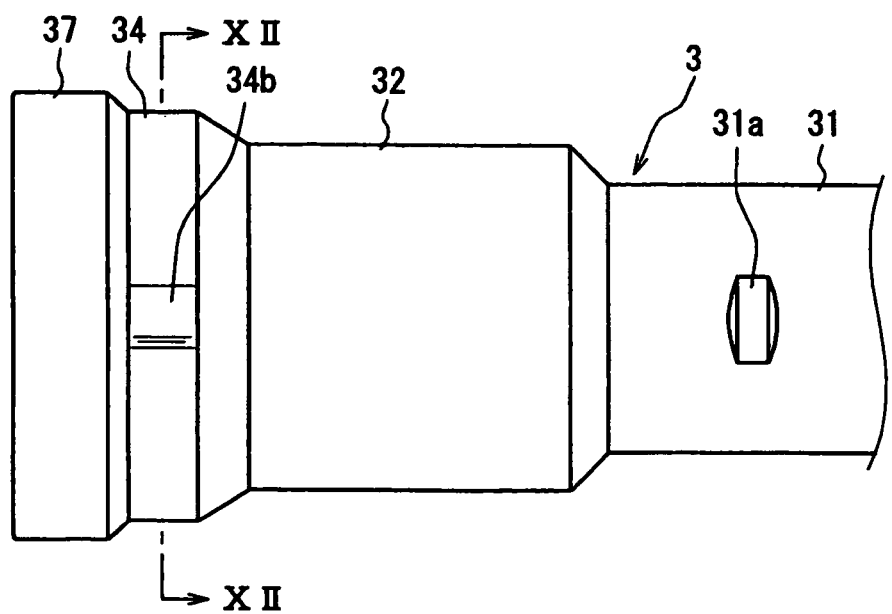
FIG. 11 is a side view of a second pipe member of the pipe joint unit according to the second embodiment.
Figure 12:
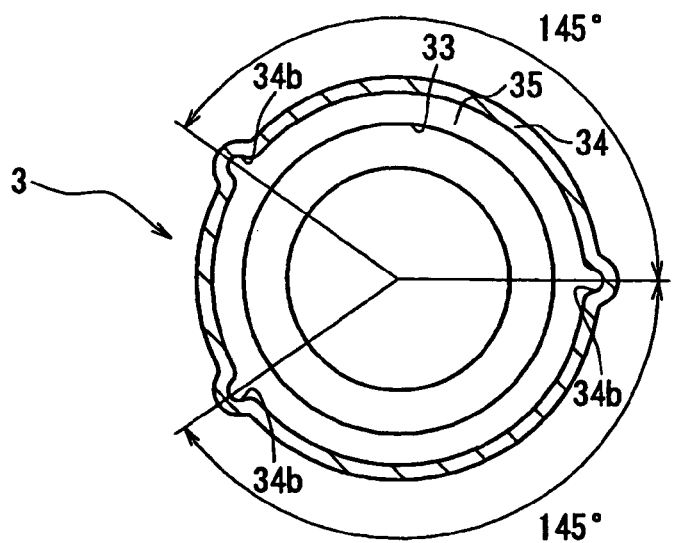
FIG. 12 is a cross-sectional view of the second pipe member taken along a line XII-XII in FIG. 11.

On the other hand, the second pipe member 3 has first fitted portions 34b in the form of grooves, in place of the first fitted portions 34a in the form of projections. As shown in FIGS. 11 and 12, the first fitted portions 34b are provided by grooves that are recessed from the inner peripheral surface of the expanded pipe portion 34 in the radially outward direction. For example, each groove has a substantially semi-circular-shaped cross-section to correspond to the projection of the first engagement portion 24b, and extends over the axial length of the expanded pipe portion 34.

The first fitting portions 24b are formed at the same time as forming the expansion 24 by bulge forming. For example, the first fitting portions 24b are formed at the same time as forming the expansion 24 by using an outer die that has a shape corresponding to the expansion 24 and having grooves corresponding to the first fitting portions 24b. The first fitted portions 34b are formed at the same time as forming the expanded pipe portion 34 by expansion forming. For example, the first fitted portions 34b are formed at the same time as forming the expanded pipe portion 34 by using an inner die that has a shape corresponding to the expanded pipe portion 34 and having projections corresponding to the first fitted portions 34b. Accordingly, manufacturing costs reduce.

Third Embodiment

In the first and second embodiments, the first fitting portions 24a, 24b are formed on the outer peripheral surface of the expansion 24, and the first fitted portions 34a, 34b are formed on the inner peripheral surface of the expanded pipe portion 34, as the rotation restricting parts. However, the rotation restricting parts may be formed on other portions at which the outer peripheral surface of the male joint 22 and the inner peripheral surface of the female joint 32 are opposed to each other.

Figure 13:
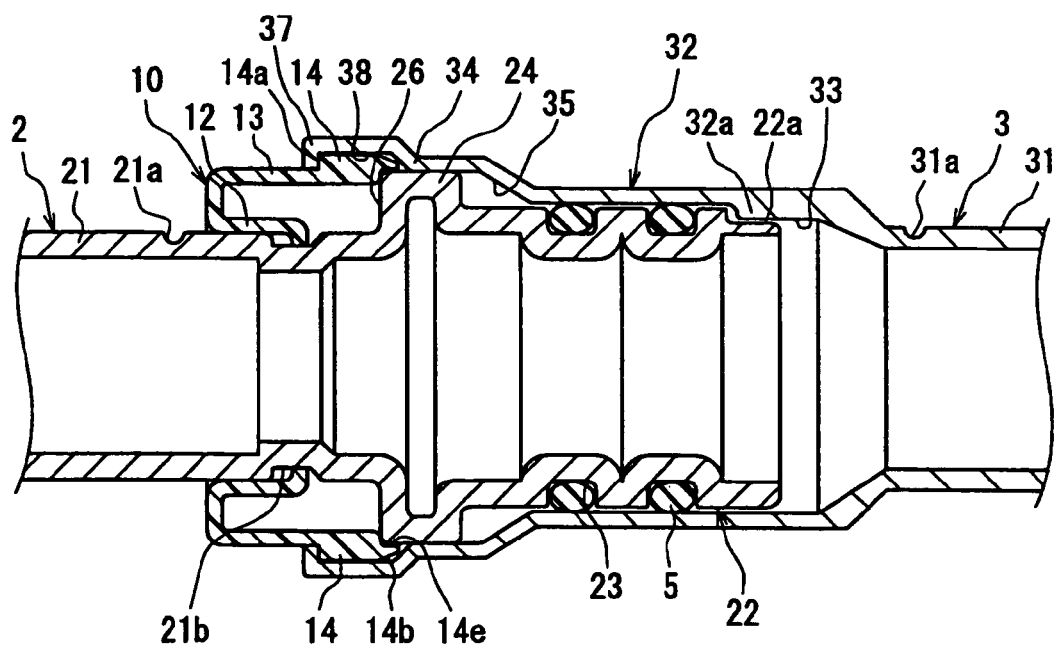
FIG. 13 is a schematic cross-sectional view of a pipe joint unit according to a third embodiment of the present invention.

In the third embodiment, for example, the male joint 22 has second fitting portions 22a as the rotation restricting parts on the outer peripheral surface at a position adjacent to a tip end thereof, such as an end of the sealing sleeve portion, as shown in FIG. 13. The female joint 32 has second fitted portions 32a as the rotation restricting parts on the inner peripheral surface at a position adjacent to a base portion of the receiving portion 33, which is opposed to the tip end of the male joint 22 in the radial direction.

The second fitting portions 22a can be provided instead of or in addition to the first fitting portions 24a, 24b. The second fitted portions 32a can be provided instead of or in addition to the first fitted portions 34a, 34b.

For example, each second fitted portion 32a is provided by a projection projecting from the inner peripheral surface of the base end of the inserting portion 33 in the radially inward direction. The projection has a substantially semi-circular-shaped cross-section, for example. Each second fitting portion 22a is provided by a groove formed on the outer peripheral surface of the end of the male joint 22, which is opposed to the based end of the inserting portion 33. The groove is recessed from the outer peripheral surface of the end of the male joint 22 in the radially inward direction and has a generally semi-circular-shaped cross-section, to correspond to the projection of the second fitted portion 32a.

The second fitting portions 22a and the second fitted portions 32a are arranged at irregular intervals in the circumferential directions of the male joint 22 and the female joint 32. Therefore, similar to the first and second embodiments, the first and second pipe members 2, 3 can be coupled in the predetermined positions.

If the second fitting portions 22a are provided by projections projecting from the outer peripheral surface in the radially outward direction, it is difficult to insert the end of the male joint 22 into the inserting portion 33 of the female joint 32. Therefore, the second fitting portions 22a are preferably provided by the grooves.

In the present embodiment, the second fitting portions 22a are formed on the outer peripheral surface of the tip end of the male joint 22, and the second fitted portions 32a are formed on the inner peripheral surface of the inserting portion 33 of the female joint 32. Because the male joint 22 and the female joint 32 can be respectively formed by expansion forming, the second fitting portions 22a and the second fitted portions 32a can be formed at the same time as forming the male joint 22 and the female joint 32, respectively, by expansion forming. As such, manufacturing costs reduce.

Fourth Embodiment

Figure 14:
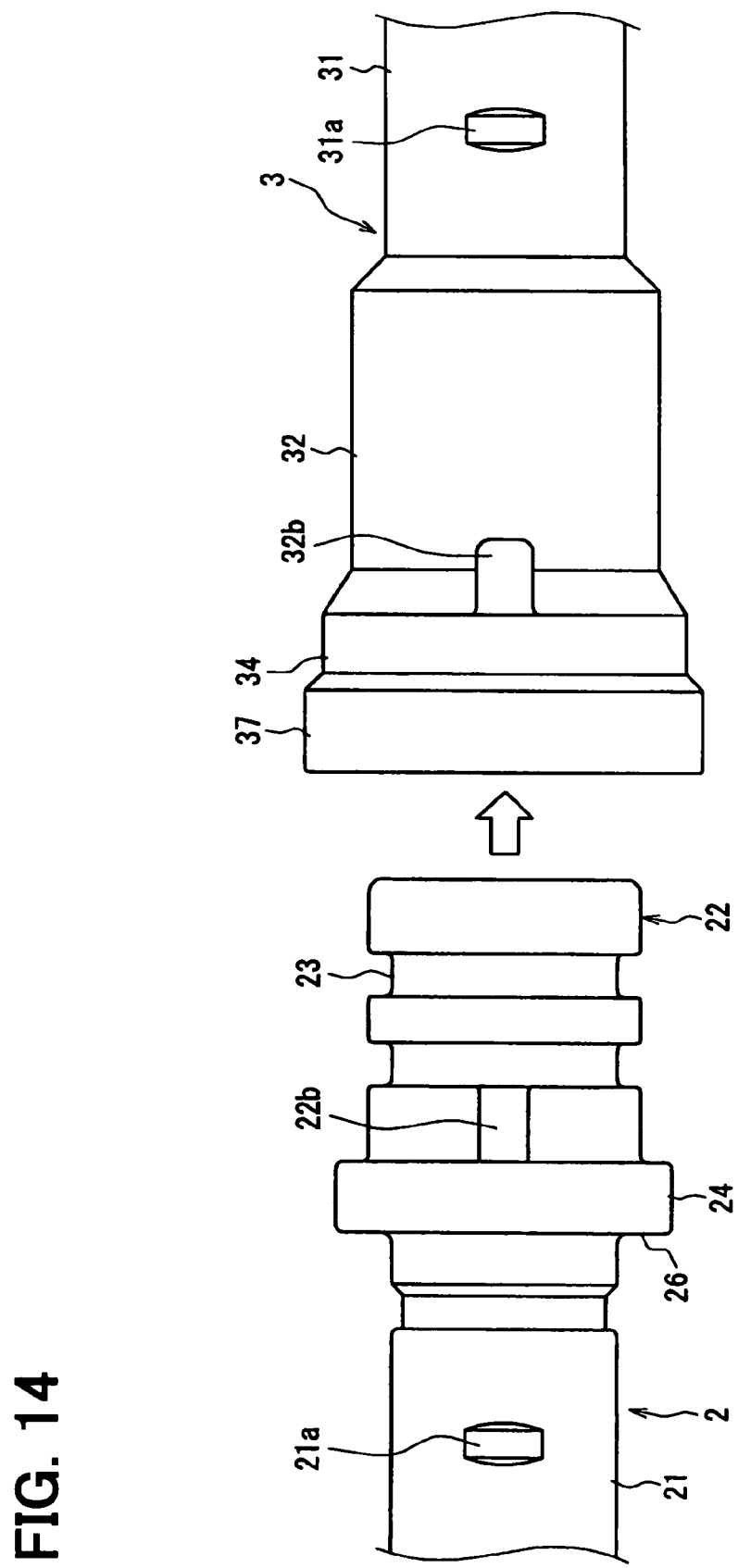
FIG. 14 is a schematic side view of a pipe joint unit before a first pipe member is coupled to a second pipe member according to a fourth embodiment of the present invention.

In the fourth embodiment, the rotation restricting parts are formed at positions different from those of the above embodiments. As shown in FIG. 14, second fitting portions 22b as the rotation restricting part are formed on an outer peripheral surface of a rear end of the sealing sleeve portion of the male joint 22, the rear end being adjacent to the expansion 24. Second fitted portions 32b as the rotation restricting parts are formed on an inner peripheral surface of the end of the inserting portion 33, which correspond to the rear end of the sealing sleeve portion of the male joint 22. For example, the second fitted portions 32b are formed on the inner peripheral surface of the conical wall portion 35.

For example, each second fitting portion 22b is provided by a projection projecting from the outer peripheral surface in the radially outward direction and having a substantially semi-circular-shaped cross-section. Each second fitted portion 32b is provided by a groove at a position corresponding to the second fitting portion 22b. The groove of the second fitted portion 32b has a substantially semi-circular-shaped cross-section to receive the projection of the second fitting portion 22b therein.

The second fitting portions 22b and the second fitted portions 32b are arranged at irregular intervals in the circumferential directions. Therefore, the first and second pipe members 2, 3 are coupled in the predetermined positions, similar to the above embodiments.

If the second fitted portions 32b are provided by projections, it is difficult to insert the male joint 22 into the inserting portion 33. Therefore, the second fitted portions 32b are preferably provided by the grooves.

In the present embodiment, the second fitting portions 22b are formed on the outer peripheral surface of the male joint 22, and the second fitted portions 32b are formed on the inner peripheral surface of the female joint 32. Since the male joint 22 and the female joint 32 can be formed by expansion forming, the second fitting portions 22b and the second fitted portions 32b can be formed at the same time as forming the male joint 22 and the female joint 32, respectively, by expansion forming. As such, manufacturing costs reduce.

Fifth Embodiment

The projections and grooves of the rotation restricting parts 24a, 24b, 34a, 34b, 22a, 32a can have any cross-sectional shapes, such as generally trapezoidal shapes, generally triangular shapes or the like, other than the generally semi-circular shapes as discussed in the above.

Figure 15:
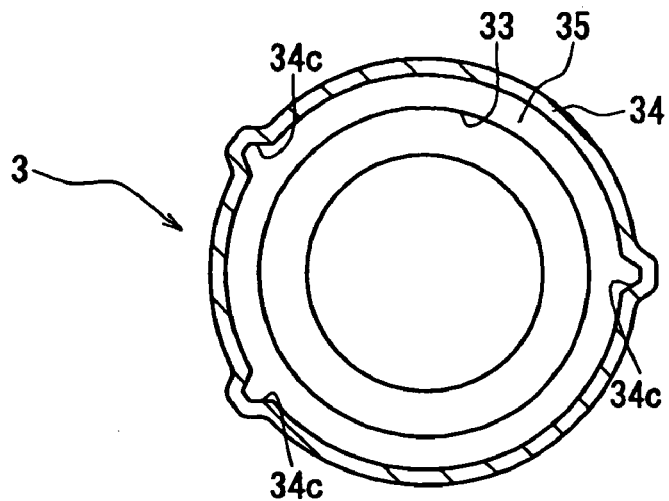
FIG. 15 is a cross-sectional view of a second pipe member of a pipe joint unit for showing cross-sectional shapes of first fitted portions according to a fifth embodiment of the present invention.

FIG. 15 shows an example of a first fitted portion 34c as the rotation restricting part formed on the female joint 32. The first engaged portion 34c has a generally polygonal-shaped cross-section, such as a generally trapezoidal shape. Although not illustrated, the rotation restricting part of the male joint 22 is provided by a projection having a cross-sectional shape, such as a generally polygonal shape, corresponding to the cross-sectional shape of the first fitted portion 34c so that the rotation restricting part of the male joint 22 can engage with the first fitted portion 34c.

Sixth Embodiment

Figure 16:
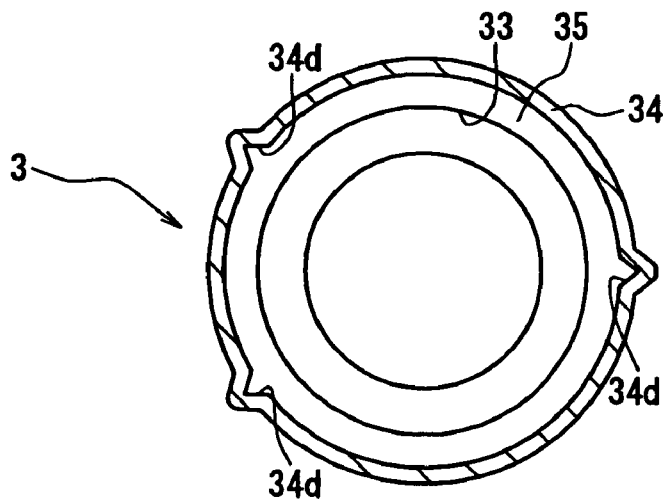
FIG. 16 is a cross-sectional view of a second pipe member of a pipe joint unit for showing cross-sectional shapes of first fitted portions according to a sixth embodiment of the present invention.

FIG. 16 shows another example of the rotation restricting part of the female joint 32. The rotation restricting part of the female joint 32 can be provided by a groove 34d having a V-shaped or generally triangular shaped cross-section. In this case, the rotation restricting part of the male joint 22 can be provided by a projection having a cross-section corresponding to the cross-sectional shape of the groove 34d so that the rotation restricting part of the male joint 22 is received in the rotation restricting part of the female joint 32.

The second fitting portions 22a, 22b and the second fitted portions 32a, 32b of the third and fourth embodiments can have the cross sectional shapes as shown in FIGS. 15 and 16 and discussed in the fifth and sixth embodiments, instead of the substantially semi-circular-shaped cross-sections.

Modifications

As discussed in the above, the rotation restricting parts can be formed on any portions of the inner peripheral surface of the female joint 32 and the outer peripheral surface of the male joint 22. Further, the rotation restricting parts can be formed at plural locations in the axial direction. Since it is not necessary to form rotation restricting parts on contact surfaces between the pipe joint member 10 and each of the first and second pipe members 2, 3, the shape of the pipe joint member 10 is simplified. In a case that the pipe joint member 10 is made of a material, such as a resinous material, different from that of the pipe members 2, 3, and the pipe joint member 10 has rotation restricting parts, the rotation restricting parts need to have sufficient strength. In this case, therefore, the pipe joint unit increases in size. In the above embodiments, on the other hand, since the rotation restricting parts are directly formed on the male and female joints 22, 32, the size of the pipe joint unit will not increase.

In the above embodiments, the pipe joint unit is exemplarily employed to couple refrigerant pipes of the refrigerant cycle of the vehicular air conditioner. However, the pipe joint may be employed to couple any other pipe members. Thus, the fluid is not limited to the refrigerant. Further, the above embodiments may be practiced with various combinations.

Additional advantages and modifications will readily occur to those skilled in the art. The invention in its broader term is therefore not limited to the specific details, representative apparatus, and illustrative examples shown and described.

What is claimed is:

1. A pipe joint unit comprising:
    a first pipe member including a male joint that has an outer peripheral surface;
    a second pipe member including a female joint that has an inner peripheral surface, the second pipe member coupled to the first pipe member such that the male joint is received in the female joint and the outer peripheral surface of the male joint is opposed to the inner peripheral surface of the female joint; and
    a pipe joint member including an engagement part that is elastically movable in a radial direction, and engaged with the first pipe member and the second pipe member, wherein
    the male joint and the female joint include rotation restricting parts on the outer peripheral surface and the inner peripheral surface, respectively,
    the rotation restricting parts are configured to restrict relative rotation of the first and second pipe members;
    the male joint includes an expansion expanding in a radially outward direction at an end thereof,
    the expansion forms the outer peripheral surface and the outer peripheral surface has a first fitting portion as the rotation restricting part,
    the female joint includes an expanded pipe portion that is located radially outside of the expansion of the male joint,
    the expanded pipe portion forms the inner peripheral surface, and the inner peripheral surface has a first fitted portion as the rotation restricting part,
    the first fitted portion is engaged with the first fitting portion so that the relative rotation of the first and second pipe members is restricted;
    the male joint includes a plurality of first fitting portions including the first fitting portion,
    the female joint includes a plurality of first fitted portions including the first fitted portion, and
    the plurality of first fitting portions and the plurality of first fitted portions are arranged at irregular intervals in circumferential directions of the male joint and the female joint.

2. The pipe joint unit according to claim 1, wherein one of the first fitting portion and the first fitted portion is in a form of projection and the other is in a form of groove.

3. The pipe joint unit according to claim 2, wherein
    the projection has one of a generally semi-circular-shaped cross-section and a generally polygonal-shaped cross-section, and
    the groove has a cross-sectional shape that corresponds to the cross-sectional shape of the projection.

4. The pipe joint unit according to claim 1, wherein
    the female joint includes an extended pipe portion at its end,
    the pipe joint member is made of a resin such that the engagement part is elastically displaceable, and
    the pipe joint member is disposed between an outer peripheral surface of the first pipe member and the extended pipe portion of the female joint, and engages with the first pipe member and the second pipe member.

5. A method of manufacturing the pipe joint unit according to claim 1, comprising:
    forming the expansion by bulge forming; and
    forming the expanded pipe portion by expansion forming, wherein
    the first fitting portion is formed at the same time as forming the expansion by bulge forming, and
    the first fitted portion is formed at the same time as forming the expanded pipe portion by expansion forming.

6. A pipe joint unit comprising:
    a first pipe member including a male joint that has an outer peripheral surface;
    a second pipe member including a female joint that has an inner peripheral surface, the second pipe member coupled to the first pipe member such that the male joint is received in the female joint and the outer peripheral surface of the male joint is opposed to the inner peripheral surface of the female joint; and
    a pipe joint member including an engagement part that is elastically movable in a radial direction, and engaged with the first pipe member and the second pipe member, wherein
    the male joint and the female joint include rotation restricting parts on the outer peripheral surface and the inner peripheral surface, respectively,
    the rotation restricting parts are configured to restrict relative rotation of the first and second pipe members;
    the outer peripheral surface of the male joint has a second fitting portion as the rotation restricting part,
    the inner peripheral surface of the female joint has a second fitted portion as the rotation restricting part,
    the second fitting portion is engaged with the second fitted portion so that the relative rotation of the first and second pipe members is restricted;

the male joint includes a plurality of second fitting portions including the second fitting portion, the female joint includes a plurality of second fitted portions including the second fitted portion, and the plurality of second fitting portions and the plurality of second fitted portions are arranged at irregular intervals in circumferential directions of the male joint and the female joint.

7. The pipe joint unit according to claim 6, wherein the second fitting portion is in a form of groove, and the second fitted portion is in a form of projection.

8. The pipe joint unit according to claim 6, wherein the second fitting portion is in a form of projection, and the second fitted portion is in a form of groove.

9. The pipe joint unit according to claim 6, wherein the second fitting portion has one of a generally semi-circular-shaped cross-section and a generally polygonal-shaped cross-section, and the second fitted portion has a cross-sectional shape that corresponds to the cross-sectional shape of the second fitting portion.

10. A method of manufacturing the pipe joint unit according to claim 6, comprising:

forming the male joint into a predetermined shape by expansion forming; and forming the female joint into a predetermined shape by expansion forming, wherein the second fitting portion is formed at the same time as forming the male joint by expansion forming, and the second fitted portion is formed at the same time as forming the female joint by expansion forming.

11. The pipe joint unit according to claim 6, wherein the female joint includes an extended pipe portion at its end, the pipe joint member is made of a resin such that the engagement part is elastically displaceable, and the pipe joint member is disposed between an outer peripheral surface of the first pipe member and the extended pipe portion of the female joint, and engages with the first pipe member and the second pipe member.

12. A pipe joint unit comprising:

a first pipe member including a male joint that has an outer peripheral surface;

a second pipe member including a female joint that has an inner peripheral surface, the second pipe member coupled to the first pipe member such that the male joint is received in the female joint and the outer peripheral surface of the male joint is opposed to the inner peripheral surface of the female joint; and a pipe joint member including an engagement part that is elastically movable in a radial direction, and engaged with the first pipe member and the second pipe member, wherein the male joint and the female joint include rotation restricting parts on the outer peripheral surface and the inner peripheral surface, respectively, the rotation restricting parts are configured to restrict relative rotation of the first and second pipe members;

the second pipe member includes a second pipe main portion having a generally tubular shape, and the female joint extends from the second pipe main portion, the female joint includes a first sleeve portion at its end adjacent to the second pipe main portion and a second sleeve portion extending from the first sleeve portion in an axial direction and having a diameter larger than that of the first sleeve portion, the first pipe member includes a first pipe main portion having a generally tubular shape, and the male joint extends from the first pipe main portion, the male joint includes an expansion that expands in a radially outward direction at its end adjacent to the first pipe main portion and a sealing sleeve portion extending from the expansion in the axial direction, the sealing sleeve portion is received radially inside of the first sleeve portion, the expansion is received radially inside of the second sleeve portion, the rotation restricting part of the male joint is provided on the outer peripheral surface of at least one of the expansion and the sealing sleeve portion, the rotation restricting part of the female joint is provided on the inner peripheral surface of at least one of the first sleeve portion and the second sleeve portion, and engages with the rotation restricting part of the male joint;

the female joint further includes a third sleeve portion that extends from the second sleeve portion and overlaps the first pipe main portion, the pipe joint member is disposed between the third sleeve portion and the first pipe main portion, and the engagement part is engaged with an end of the third sleeve portion and an end of the expansion in the axial direction.

13. The pipe joint unit according to claim 12, wherein the sealing sleeve portion has a sealing member to seal between the sealing sleeve portion and the first sleeve portion.

14. The pipe joint unit according to claim 12, wherein the female joint includes an extended pipe portion at its end, the pipe joint member is made of a resin such that the engagement part is elastically displaceable, and the pipe joint member is disposed between an outer peripheral surface of the first pipe member and the extended pipe portion of the female joint, and engages with the first pipe member and the second pipe member.

* * * * *